United States Patent
Lemus et al.

(10) Patent No.: US 9,846,526 B2
(45) Date of Patent: Dec. 19, 2017

(54) MULTI-USER COLLABORATION TRACKING METHODS AND SYSTEMS

(71) Applicant: Verizon and Redbox Digital Entertainment Services, LLC, Basking Ridge, NJ (US)

(72) Inventors: Anthony Lemus, Irving, TX (US); Brian F. Roberts, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 582 days.

(21) Appl. No.: 13/929,875

(22) Filed: Jun. 28, 2013

(65) Prior Publication Data

US 2015/0007055 A1    Jan. 1, 2015

(51) Int. Cl.
| | | |
|---|---|---|
| G06F 3/0484 | (2013.01) | |
| G06F 3/0488 | (2013.01) | |
| G06T 11/60 | (2006.01) | |
| H04L 29/06 | (2006.01) | |
| G06F 3/01 | (2006.01) | |
| G06F 3/0354 | (2013.01) | |
| H04L 29/08 | (2006.01) | |

(52) U.S. Cl.
CPC .......... *G06F 3/0484* (2013.01); *G06F 3/017* (2013.01); *G06F 3/0354* (2013.01); *G06F 3/0488* (2013.01); *H04L 65/403* (2013.01); *H04L 65/4015* (2013.01); *H04L 67/22* (2013.01); *G06T 11/60* (2013.01)

(58) Field of Classification Search
CPC . G06F 3/0484; H04L 65/4015; H04L 65/403; H04L 67/22; H04L 12/1813; H04L 12/1831; H04L 67/2842; G06Q 10/101; G06Q 10/103

USPC .............. 715/753, 202, 215, 762; 707/608; 709/204

See application file for complete search history.

(56) References Cited

U.S. PATENT DOCUMENTS

| | | | |
|---|---|---|---|
| 6,999,061 B2* | 2/2006 | Hara | G06F 3/04883 178/18.01 |
| 7,032,179 B2* | 4/2006 | Mack | G06T 11/60 715/744 |
| 7,185,054 B1* | 2/2007 | Ludwig | G06F 3/0482 348/E7.081 |

(Continued)

OTHER PUBLICATIONS

Scott, Stacey D., M. Sheelagh T. Carpendale, and Kori M. Inkpen. "Territoriality in collaborative tabletop workspaces." Proceedings of the 2004 ACM conference on Computer supported cooperative work. ACM, 2004.*

(Continued)

*Primary Examiner* — Kevin L Young
*Assistant Examiner* — Maria Ayad

(57) ABSTRACT

An exemplary method includes a multi-user collaboration tracking system 1) detecting an initiation of a collaboration session during which a plurality of users interact with a whiteboard space displayed on a single physical display associated with a computing device, 2) detecting an interaction event performed with respect to the whiteboard space during the collaboration session, 3) identifying a user included in the plurality of users as having performed the interaction event, and 4) associating the interaction event with the user. Corresponding methods and systems are also disclosed.

19 Claims, 17 Drawing Sheets

(56) References Cited

U.S. PATENT DOCUMENTS

| | | | | |
|---|---|---|---|---|
| 7,219,233 | B1* | 5/2007 | Hendriks | G06K 9/00885 713/182 |
| 7,274,356 | B2* | 9/2007 | Ung | G06F 3/0421 178/18.09 |
| 7,379,848 | B2* | 5/2008 | Yu et al. | 702/186 |
| 7,450,114 | B2* | 11/2008 | Anwar | G06F 3/1203 178/18.01 |
| 7,535,481 | B2* | 5/2009 | Dehlin | G06F 3/0425 345/156 |
| 8,878,785 | B1* | 11/2014 | Nordstrom | G06F 3/04883 345/157 |
| 8,887,068 | B2* | 11/2014 | Roberts | G06Q 10/10 715/753 |
| 8,924,864 | B2* | 12/2014 | Mariotti | G06F 19/321 715/753 |
| 8,990,709 | B2* | 3/2015 | Lemmey | G06F 3/0481 715/753 |
| 9,250,792 | B2* | 2/2016 | DeLuca | G06F 3/0488 |
| 9,251,407 | B2* | 2/2016 | Kaehler | G06F 3/017 |
| 9,479,549 | B2* | 10/2016 | Pearson | H04L 65/403 |
| 9,696,792 | B2* | 7/2017 | Na | G06F 3/01 |
| 2002/0072947 | A1* | 6/2002 | Nakamura | 705/8 |
| 2003/0234772 | A1* | 12/2003 | Zhang | G06F 17/30843 345/177 |
| 2005/0140696 | A1* | 6/2005 | Buxton | 345/660 |
| 2006/0010400 | A1* | 1/2006 | Dehlin | G06F 3/0354 715/856 |
| 2006/0092178 | A1* | 5/2006 | Tanguay, Jr. | G06K 9/00355 345/629 |
| 2006/0146765 | A1* | 7/2006 | Van De Sluis | G06F 3/016 370/338 |
| 2007/0057923 | A1* | 3/2007 | Kitazaki | 345/173 |
| 2010/0052851 | A1* | 3/2010 | Kaehler | G06F 3/017 340/5.81 |
| 2010/0079369 | A1* | 4/2010 | Hartmann | G06F 3/0416 345/156 |
| 2010/0199230 | A1* | 8/2010 | Latta et al. | 715/863 |
| 2011/0029893 | A1* | 2/2011 | Roberts | G06Q 10/10 715/753 |
| 2011/0270824 | A1* | 11/2011 | Morris | G06F 17/30991 707/722 |
| 2012/0054601 | A1* | 3/2012 | Cohen | G06F 9/4443 715/243 |
| 2012/0060127 | A1* | 3/2012 | Ilmonen | 715/863 |
| 2012/0110429 | A1* | 5/2012 | Tzonis et al. | 715/230 |
| 2012/0254782 | A1* | 10/2012 | Van Ieperen et al. | 715/765 |
| 2012/0320073 | A1* | 12/2012 | Mason | G06F 3/1431 345/581 |
| 2013/0086487 | A1* | 4/2013 | Findlay | H04N 7/15 715/753 |
| 2013/0159939 | A1* | 6/2013 | Krishnamurthi | 715/863 |
| 2013/0198653 | A1* | 8/2013 | Tse | G06F 3/0484 715/751 |
| 2013/0229353 | A1* | 9/2013 | Hartmann | G06F 3/0416 345/168 |
| 2014/0075330 | A1* | 3/2014 | Kwon | G06F 3/038 715/750 |
| 2014/0212007 | A1* | 7/2014 | Oh | 382/119 |
| 2014/0282089 | A1* | 9/2014 | West | H04L 65/403 715/753 |
| 2015/0135108 | A1* | 5/2015 | Pope et al. | 715/767 |

OTHER PUBLICATIONS

Dietz, Paul, and Darren Leigh. "DiamondTouch: a multi-user touch technology." Proceedings of the 14th annual ACM symposium on User interface software and technology. ACM, 2001.*

* cited by examiner

| Interaction Event | Performed By | Time |
|---|---|---|
|  402-1 | User A | 10:12 am |
|  402-2 | User A | 10:14 am |
|  402-3 | User B | 10:18 am |
| Reverse Pinch Zoom 1002-1 | User B | 10:21 am |
|  402-4 | User B | 10:22 am |
| Pinch Zoom Out 1002-2 | User C | 10:25 am |
|  402-5 | User C | 10:29 am |
|  402-6 | User C | 10:31 am |

US 9,846,526 B2

MULTI-USER COLLABORATION TRACKING METHODS AND SYSTEMS

BACKGROUND INFORMATION

Whiteboards and other types of displays (e.g., tablet computer displays) are often used during brainstorming sessions and other types of in-person meetings to facilitate participant collaboration, provide instruction, and/or illustrate concepts being discussed during the meetings. For example, a group of engineers may each make annotations (e.g., text and/or drawings) on a whiteboard during a collaboration session in which the engineers have been tasked with coming up with a solution for a particular technical problem.

Unfortunately, once a collaboration session in which multiple participants have interacted with a single display (e.g., by performing various types of interaction events with respect to the display, such as writing on the display, drawing in the display, performing one or more touch gestures with respect to the display, etc.) has ended, it may be difficult to ascertain which participant performed each of the interaction events. For example, with reference to the example provided above, it may be difficult to ascertain which engineer came up with a particular idea described in one of the annotations written on the whiteboard.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
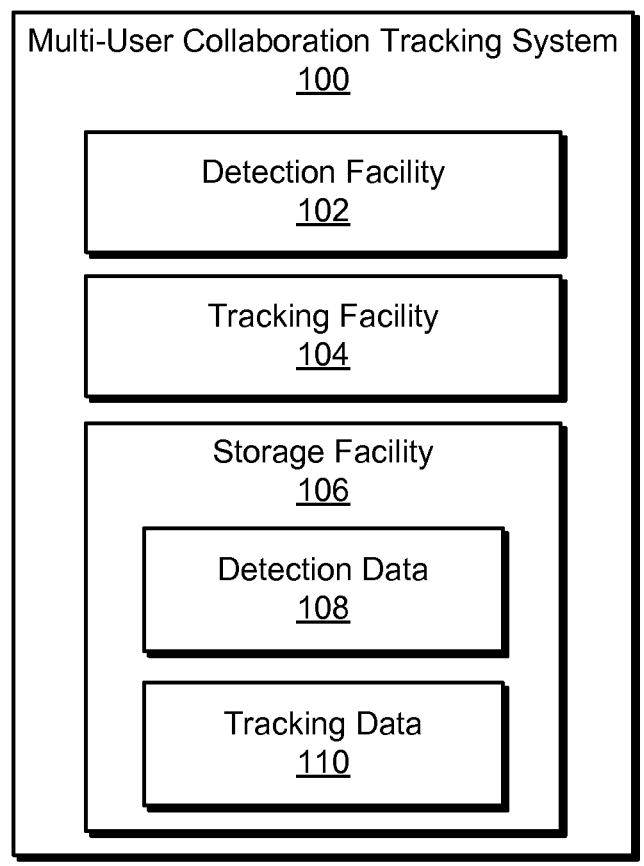
FIG. 1 illustrates an exemplary multi-user collaboration tracking system according to principles described herein.

Multi-user collaboration tracking methods and systems are described herein. As will be described below, a multi-user collaboration tracking system may 1) detect an initiation of a collaboration session during which a plurality of users interact with a whiteboard space of a single physical display associated with a computing device, 2) detect an interaction event performed with respect to the whiteboard space during the collaboration session, 3) identify a user included in the plurality of users as having performed the interaction event, and 4) associate the interaction event with the user.

To illustrate, during a collaboration session (i.e., a multi-user in-person meeting, such as a brainstorming session, a training session, etc.) in which a plurality of users interact with an a whiteboard space displayed on a single physical display (e.g., an electronic whiteboard, a display screen of a mobile device (e.g., a tablet computer or a mobile phone), or other type of display associated with a computing device), one of the users may perform an interaction event with respect to the whiteboard space. As used herein, a "whiteboard space" refers to any interface within which the users may draw or otherwise create graphical objects and/or perform one or more touch gestures. In some examples, the whiteboard space may resemble a blank piece of paper, a blank whiteboard or chalkboard, or the like before the collaboration session commences. In some examples, the whiteboard space may be displayed as part of an application executed by the computing device.

As used herein, an "interaction event" may include any action performed with respect to a whiteboard space displayed on a single physical display. For example, an interaction event may include a creation of a graphical object that is displayed within the whiteboard space. The graphical object may be created by writing on, drawing on, or otherwise touching the display with a finger, electronic whiteboard marker, stylus, or other writing instrument. Additionally or alternatively, an interaction event may include a touch gesture (e.g., a swipe, a reverse-pinch, a pinch, a tap, a rotation, etc.) performed by the user with respect to the whiteboard space.

The multi-user collaboration tracking system may identify the user who performed the interaction event in any suitable manner. For example, the multi-user collaboration tracking system may automatically identify the user based on an orientation of the interaction event with respect to the display and/or one or more other attributes of the interaction event. Additionally or alternatively, the multi-user collaboration tracking system may identify the user in accordance with a tagging touch gesture performed with respect to the whiteboard space before or after the interaction event is performed. Once the user has been identified, the multi-user collaboration tracking system may associate the interaction event with the user (e.g., by generating metadata associated with the interaction event that links the interaction event to the user). Examples of identifying the user who performed the interaction event and associating the interaction event with the user will be provided in more detail below.

The methods and systems described herein may allow a user (e.g., a participant in a multi-user collaboration session and/or any other person not involved in the collaboration session) to ascertain specific contributions made by each user during the collaboration session. This may be beneficial in terms of follow up that may need to be done with respect to the collaboration session, identification of person(s) to be listed as contributing to and/or conceiving of a particular idea or topic discussed during the collaboration session, and/or for a variety of other reasons as may serve a particular implementation.

FIG. 1 illustrates an exemplary multi-user collaboration tracking system 100 ("system 100"). As shown, system 100 may include, without limitation, a detection facility 102, a tracking facility 104, and a storage facility 106 selectively and communicatively coupled to one another. Storage facility 106 may be configured to maintain detection data 108 generated and/or used by detection facility 102 and tracking data 110 generated and/or used by tracking facility 104. Storage facility 106 may maintain additional or alternative data as may serve a particular implementation. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect an initiation of a collaboration session during which a plurality of users interact with a whiteboard space displayed on a single physical display (referred to herein as a "single display" or simply as a "display) associated with a computing device. Detection facility 102 may detect an initiation of a collaboration session in any suitable manner. For example, detection facility 102 may detect user input representative of an initiation of the collaboration session. Such user input may include, but is not limited to, as selection of a button or option configured to initiate the collaboration session, initiation of an application used to facilitate the collaboration session (e.g., an application executed by a mobile device, such as a tablet computer), an interaction event performed with respect to the whiteboard space (e.g., detection facility 102 may detect that a user has started to write or draw within the whiteboard space), and/or any other user input as may serve a particular implementation.

Figure 2:
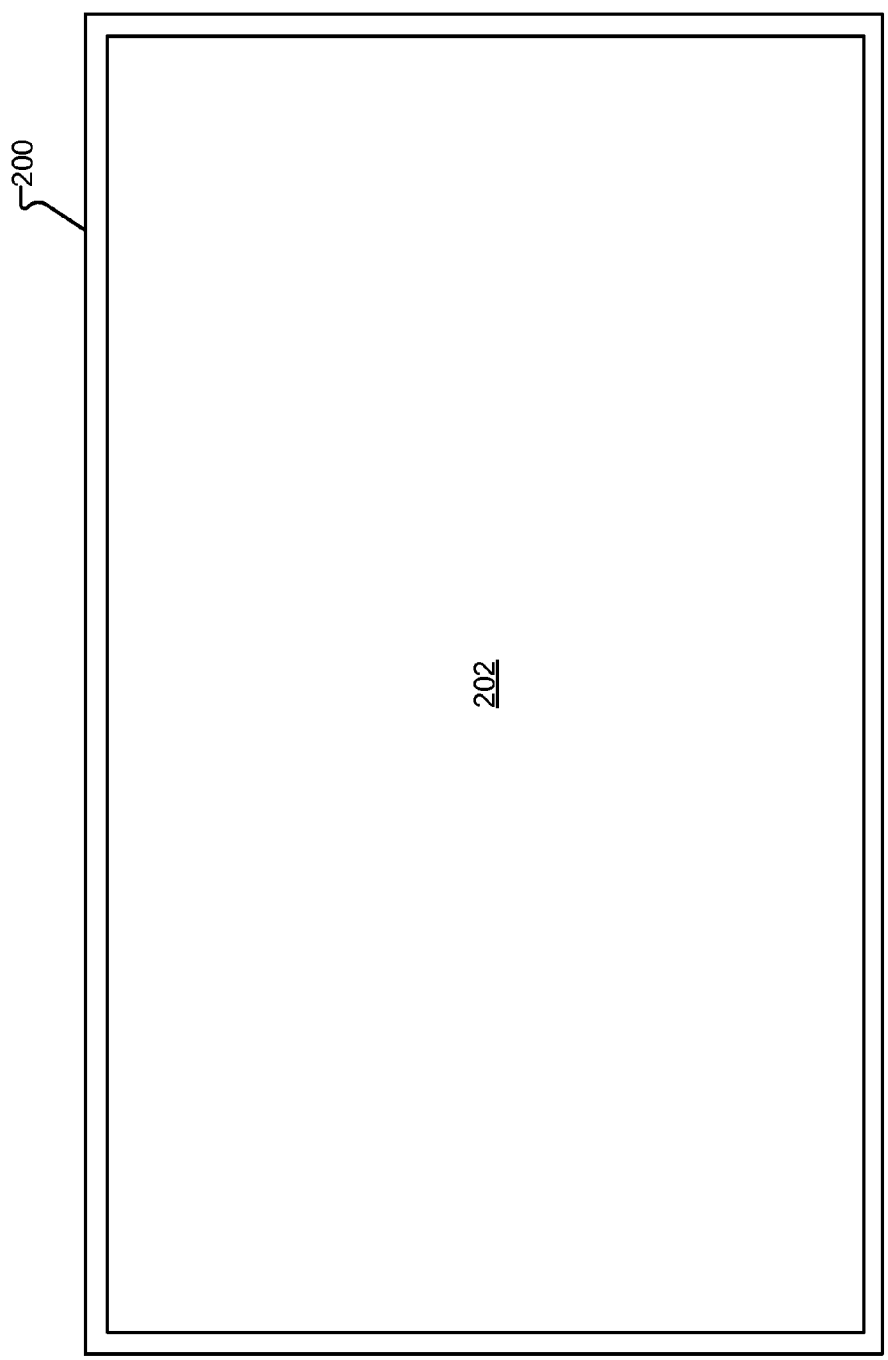
FIG. 2 shows an exemplary whiteboard with which users may interact during a collaboration session according to principles described herein.

The users may interact with a whiteboard space displayed on any suitable physical display associated with any suitable computing device as may serve a particular implementation. For example, FIG. 2 shows an exemplary whiteboard 200 that may serve as the display in accordance with the methods and systems described herein. Whiteboard 200 may include any suitable electronic or interactive whiteboard as may serve a particular implementation and may be associated with any suitable computing device. For example, whiteboard 200 may be connected to or otherwise integrated into a personal computer, one or more processors, and/or any other type of computing device as may serve a particular implementation. In some examples, whiteboard 200 may include a traditional whiteboard not connected directly to a computing device. In these examples, one or more tracking devices (e.g., one or more cameras and/or sensors) associated with a computing device may be configured to detect interaction with whiteboard 200. As shown, a whiteboard space 202 with which the users may interact during a collaboration session may be displayed on whiteboard 200.

Figure 3:
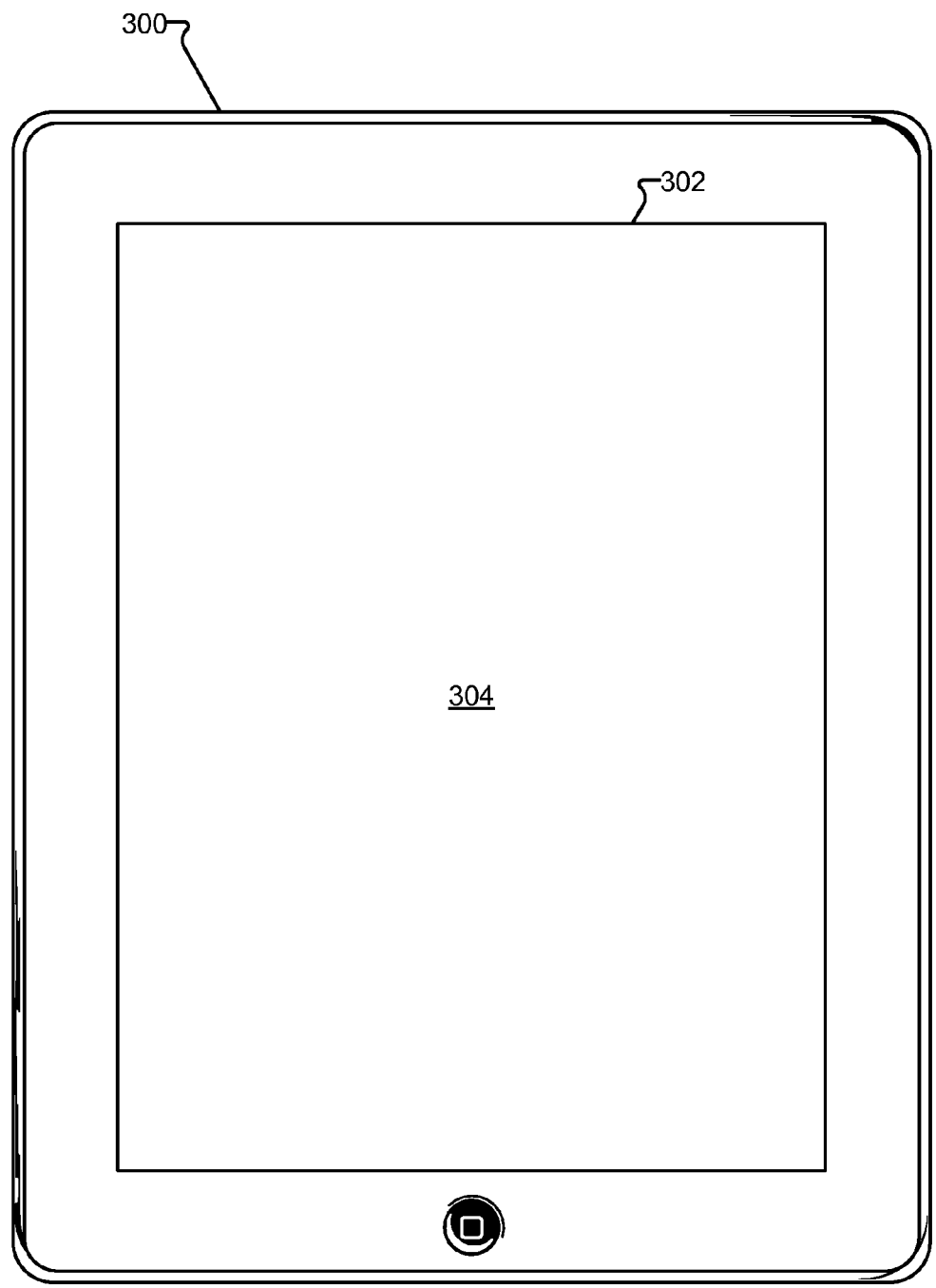
FIG. 3 shows an exemplary mobile device having a display screen with which users may interact during a collaboration session according to principles described herein.

The display may alternatively include a display screen of a mobile device. For example, FIG. 3 shows an exemplary mobile device 300 that includes a display screen 302 integrated therewith. A whiteboard space 304 may be displayed within any portion of display screen 302. For example, as shown in FIG. 3, whiteboard space 304 occupies an entire viewing area of display screen 302. As will be described in more detail below, users may utilize an application executed by mobile device 300 to facilitate the collaboration session. Other displays that may be used in accordance with the methods and systems described herein include, but are not limited to, television displays, computer monitors, projector displays, etc.

Detection facility 102 may be further configured to detect an interaction event performed with respect to the whiteboard space displayed on the display during the collaboration session. Detection facility 102 may detect an interaction event performed with respect to the whiteboard space in any suitable manner. For example, detection facility 102 may detect a creation of a graphical object that is displayed within the whiteboard space. As mentioned, the graphical object may be created by a user writing on, drawing on, or otherwise touching the whiteboard space displayed within the display with a finger, electronic whiteboard marker, stylus, or other writing instrument.

Figure 4:
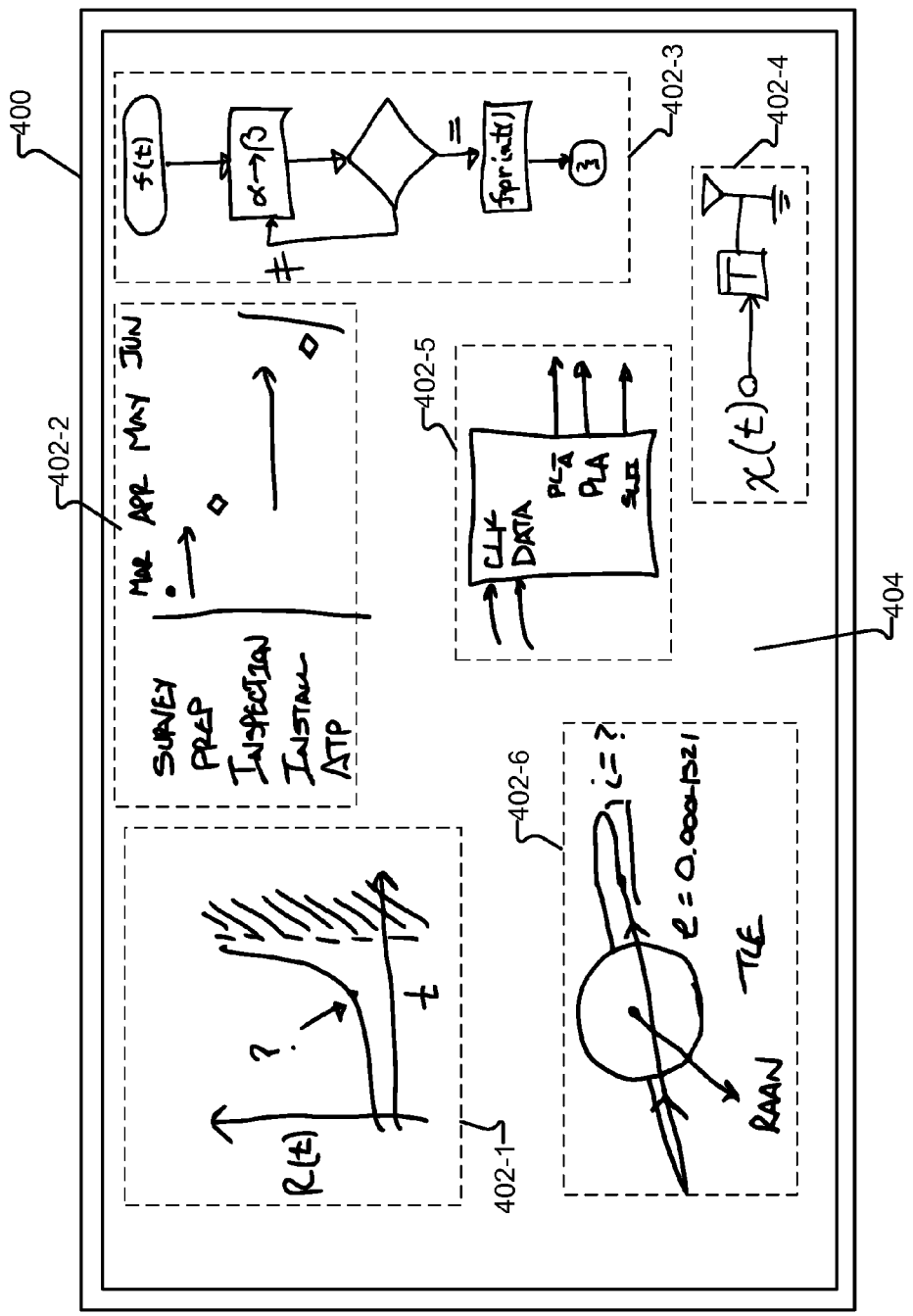
FIGS. 4-9 illustrate exemplary interactive events that may be performed with respect to a display during a collaboration session according to principles described herein.

To illustrate, FIG. 4 shows a display 400 (e.g., a whiteboard) with a plurality of graphical objects 402 (e.g., graphical display objects 402-1 through 402-6) displayed within whiteboard space 404 displayed on display 400. Each graphical object 402 is surrounded by a dotted border in FIG. 4 to differentiate them one from another.

As shown, each graphical object 402 may include one or more display elements (i.e., text, drawings, etc.) drawn by a user. In some examples, a graphical object 402 may alternatively be created by inserting an electronic image (e.g., clipart), typing text, and/or otherwise interacting with whiteboard space 400. In some examples, each graphical object 402 may be created by different users during a collaboration session. For example, graphical objects 402-1 and 402-2 may be created by a first user, graphical objects 402-3 and 402-4 may be created by a second user, and graphical objects 402-5 and 402-6 may be created by a third user.

Detection facility 102 may alternatively detect an interaction event performed with respect to the whiteboard space displayed on the display by detecting a touch gesture performed with respect to the whiteboard space. The touch gesture may include one or more a swipe, a reverse-pinch, a pinch, a tap, a double tap, a rotation, and/or any other type of touch gesture performed with one or more fingers, styluses, writing instruments, and/or any other object as may serve a particular implementation. In some examples, the touch gesture may include a selection of a graphical option displayed within the whiteboard space. For example, the touch gesture may include a selection of a graphical representation of a button displayed within the whiteboard space.

Tracking facility 104 may be configured to perform various tracking operations associated with interaction events performed by users with respect to a whiteboard space displayed on a display during a collaboration session. For example, in response to detection facility 102 detecting an interaction event performed with respect to a whiteboard space displayed on a display during a collaboration session in which a plurality of users are participating, tracking facility 104 may identify a user included in the plurality of users as having performed the interaction event.

Tracking facility 104 may identify the user as having performed the interaction event in any suitable manner. For example, if the interaction event includes a creation by the user of a graphical object that is displayed within the whiteboard space, tracking facility 104 may identify the user as having created the graphical object by detecting a performance of a tagging touch gesture that is unique to the user. As used herein, a "tagging touch gesture" may refer to any type of touch gesture that has been defined to be associated with a particular user. For example, a particular user may provide input defining a particular touch gesture (e.g., a drawing of a particular shape or object (e.g., a circle, rectangle, checkmark, star, etc.), a double tap, a swipe, etc.) as being his or her unique tagging touch gesture.

The tagging touch gesture may be performed by any of the users and may be performed at any time with respect to the creation of the graphical object as may serve a particular implementation. For example, the tagging touch gesture may be performed after the creation of the graphical object. To illustrate, a particular user may define a drawing of a circle around a graphical object as being his or her unique tagging touch gesture. The user may then circle each of the graphical objects that he or she created in order to indicate that he or she should be associated with those graphical objects. This is illustrated in FIG. 5, which shows the same display 400 described in connection with FIG. 4.

Figure 5:
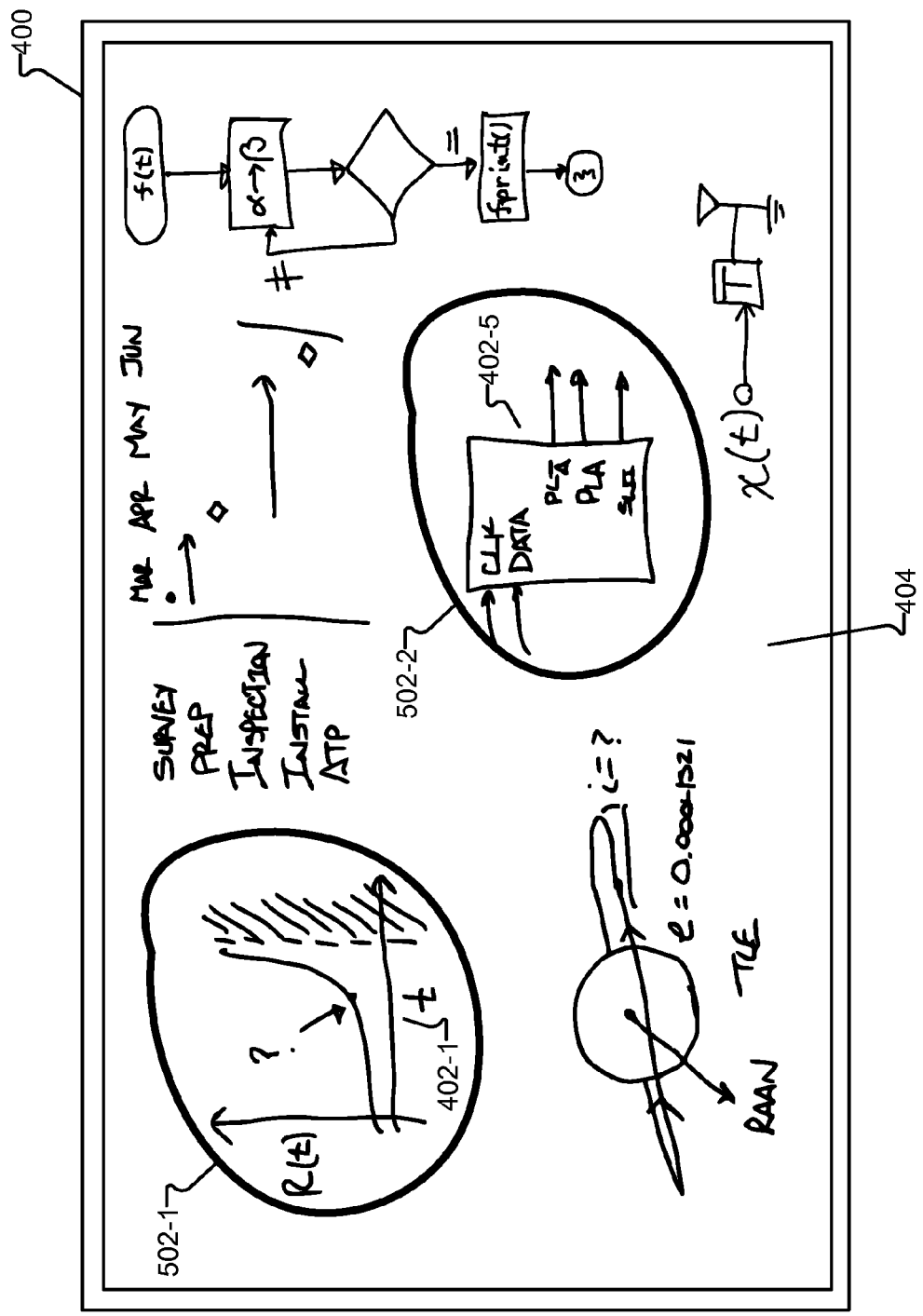

As shown in FIG. 5, a user has drawn circles 502-1 and 502-2 around graphical objects 402-1 and 402-5, respectively. Tracking facility 104 may detect the creation of circles 502-1 and 502-2 and determine that graphical objects 402-1 and 402-5 are located within circles 502-1 and 502-2. Tracking facility 104 may then identify the user as having created graphical objects 402-1 and 402-5 by determining that the user is associated with the tagging touch gesture represented by circles 502-1 and 502-2.

As another example, tracking facility 104 may detect a selection of a graphical object displayed within the whiteboard space displayed on the display, detect a tagging touch gesture performed with respect to the selected graphical object, and identify a particular user as having created the graphical object based on the tagging touch gesture.

Figure 6:
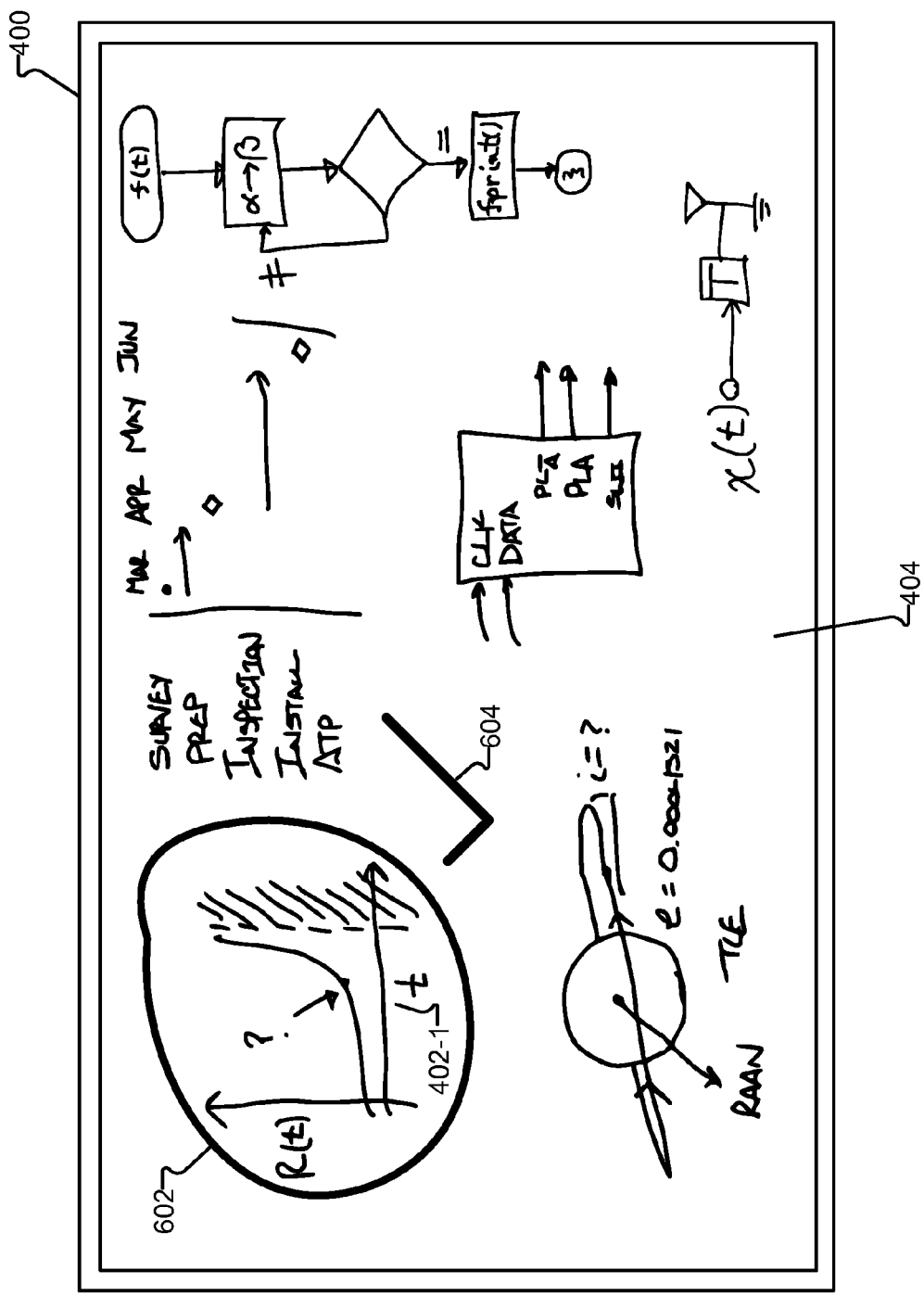

To illustrate, reference is made to FIG. 6, which shows the same display 400 described in connection with FIG. 4. As shown, a user has selected graphical object 402-1 by drawing a circle 602 around graphical object 402-1. Graphical object 402-1 may alternatively be selected in any other suitable manner. After graphical object 402-1 has been selected, the user may perform a tagging touch gesture unique to a particular user in order to indicate that the particular user created graphical object 402-1. For example, FIG. 6 shows that the user has drawn a checkmark 604 on whiteboard space 402 after selecting graphical object 402-1. Tracking facility 104 may detect checkmark 604, determine that the particular user is associated with checkmark 604, and accordingly identify the particular user as having created graphical object 402-1. It will be recognized that circles 502-1 and 502-2 and checkmark 604 are merely illustrative of the many different types of tagging touch gestures that may be performed by a user in order to indicate who created a particular graphical object.

As another example, tracking facility 104 may detect a tagging touch gesture performed with respect to the whiteboard space displayed on the display prior to an interaction event (e.g., a creation of a graphical object and/or a touch gesture) being performed, determine that no other intervening tagging touch gesture has been performed with respect to the whiteboard space in between the tagging touch gesture being performed and the interaction event being performed, and identify the user based on the tagging touch gesture.

Figure 7:
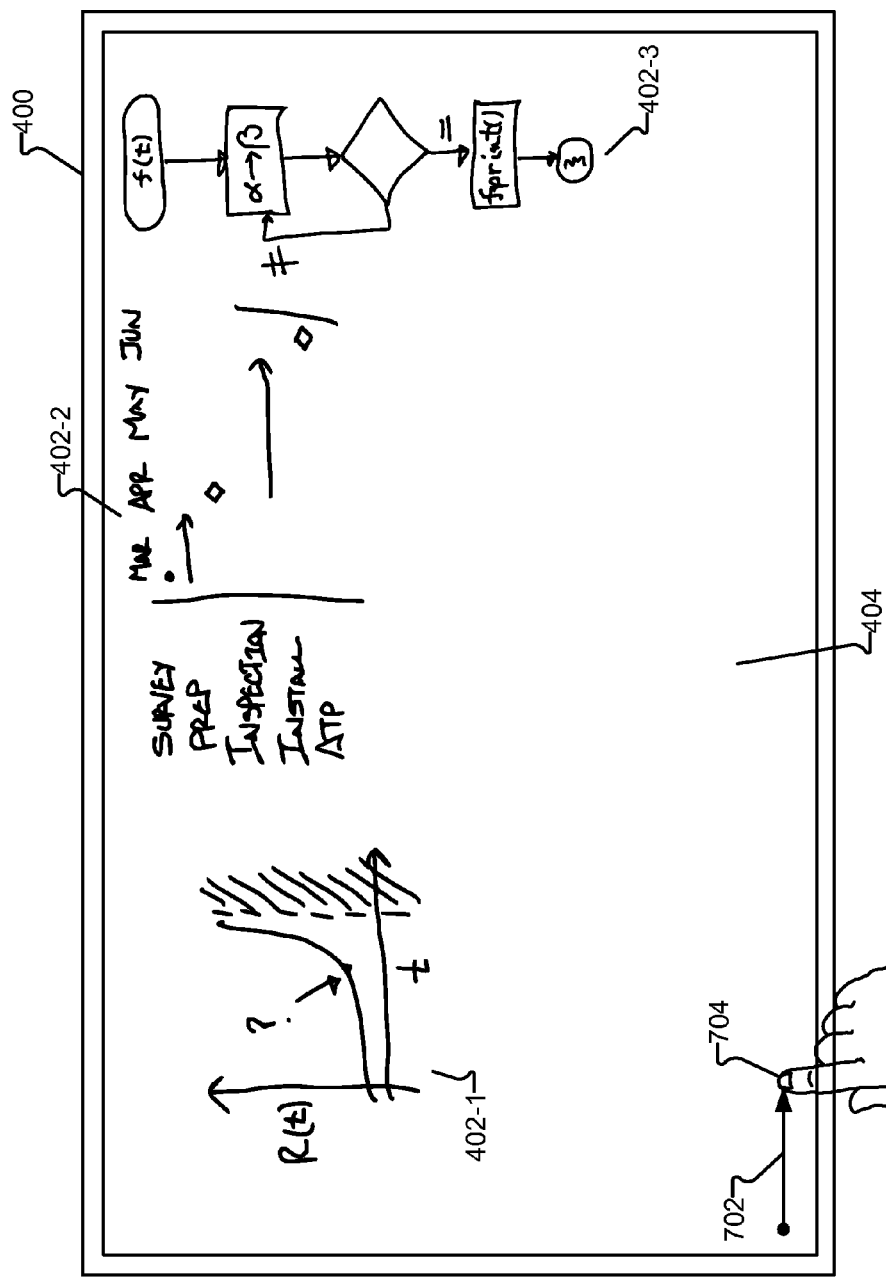
Figure 8:
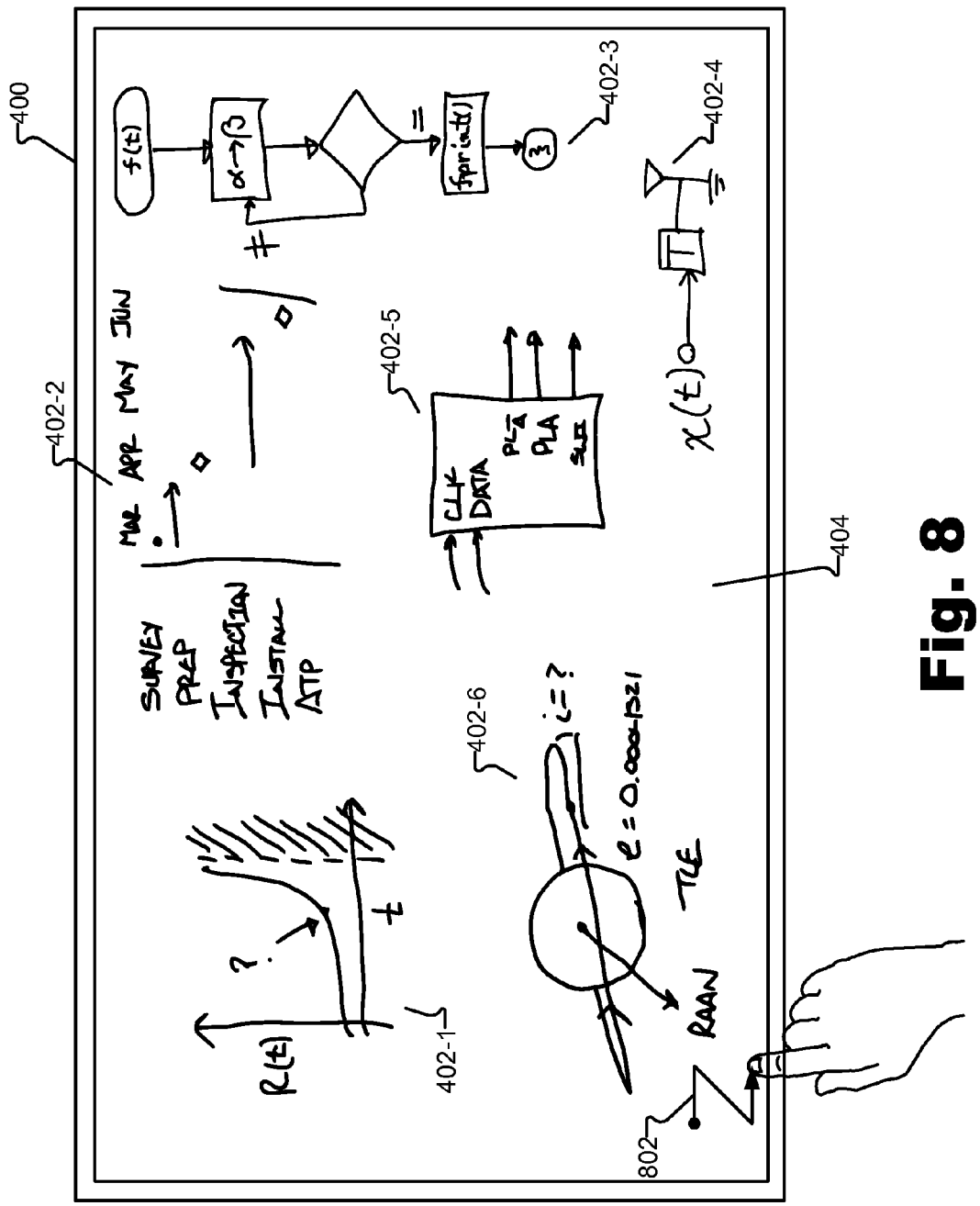

To illustrate, reference is made to FIGS. 7-8, which show the same display 400 described in connection with FIG. 4. As shown in FIG. 7, a user may perform a tagging touch gesture (represented by arrow 702) by swiping to the right within whiteboard space 402 with a finger 704. Tracking facility 104 may detect the tagging touch gesture, determine that a particular user is associated with the tagging touch gesture, and identify the particular user as having performed all interaction events performed subsequent to the performance of the tagging touch gesture until another tagging touch gesture is performed and/or until the user indicates in any suitable manner that he or she has stopped interacting with whiteboard space 402. For example, FIG. 8 shows that three graphical objects (i.e., graphical objects 402-4 through 402-6) have been created when a subsequent tagging touch gesture (i.e., a tagging touch gesture represented by arrow 802) is performed (e.g., by the same user that performed the tagging touch gesture represented by arrow 702 in FIG. 7 or a different user). Tracking facility 104 may accordingly identify the user associated with the tagging touch gesture represented by arrow 702 as having created graphical objects 402-4 through 402-6.

Tracking facility 104 may recognize that a tagging touch gesture is being performed and/or that a graphical object is being selected (as opposed to a graphical object being created) in any suitable manner. For example, tracking facility 104 may determine that a tagging touch gesture is being performed based on the context of the tagging touch gesture, a location within the whiteboard space at which the tagging touch gesture is performed (e.g., a touch gesture may be identified as being a tagging touch gesture if the touch gesture is performed in a designated area of the whiteboard space), input provided by the user prior to the tagging touch gesture being performed (e.g., the user may provide a command immediately prior to performing the tagging touch gesture that indicates to tracking facility 104 that the user is about to perform a tagging touch gesture), and/or in any other suitable manner as may serve a particular implementation.

In some examples, tracking facility 104 may automatically identify a user as having performed an interaction event with respect to a whiteboard space displayed on a display by detecting a particular type of handwriting used to perform the interaction event. For example, with respect to FIG. 4, tracking facility 104 may analyze the handwriting used to create graphical object 402-2 and determine that the handwriting is associated with a particular user. Tracking facility 104 may accordingly identify the user as having created graphical object 402-2.

In some examples, tracking facility 104 may "learn" the handwriting associated with a particular user. For example, tracking facility 104 may identify a particular user as having created graphical object 402-2 in any other way (e.g., by detecting a tagging touch gesture performed with respect to graphical object 404-2). Tracking facility 104 may then analyze the handwriting associated with graphical object 404-2 and associate the handwriting with the user. Graphical objects subsequently created using the same handwriting may then be automatically attributed to the user.

Tracking facility 104 may additionally or alternatively identify a user as having performed an interaction event with respect to a whiteboard space displayed on a display by detecting audio associated with the user while the interaction event is performed. For example, a user may be speaking while he or she performs an interaction event with respect to a whiteboard space. Tracking facility 104 may detect the user's voice, identify the user based on the detected voice, and accordingly identify the user as having performed the interaction event. In some examples, audio detected during a collaboration session may be tagged with the various interaction events performed during the collaboration session. In this manner, a user may subsequently select a particular interaction event to play back audio associated with the interaction event. Voice contributions made by individual users may also be tracked and identified as interaction events performed during the collaboration session.

In some examples, tracking facility 104 may automatically identify a user as having performed an interaction event with respect to a whiteboard space displayed on a display based on an orientation of the interaction event with respect to the display. For example, a group of users may surround and interact with a display screen of a mobile device (e.g., a tablet computer) resting on top of a table. As such, the interaction events performed by each user may be oriented differently with respect to the display screen based on a position of each user with respect to the mobile device.

Figure 9:
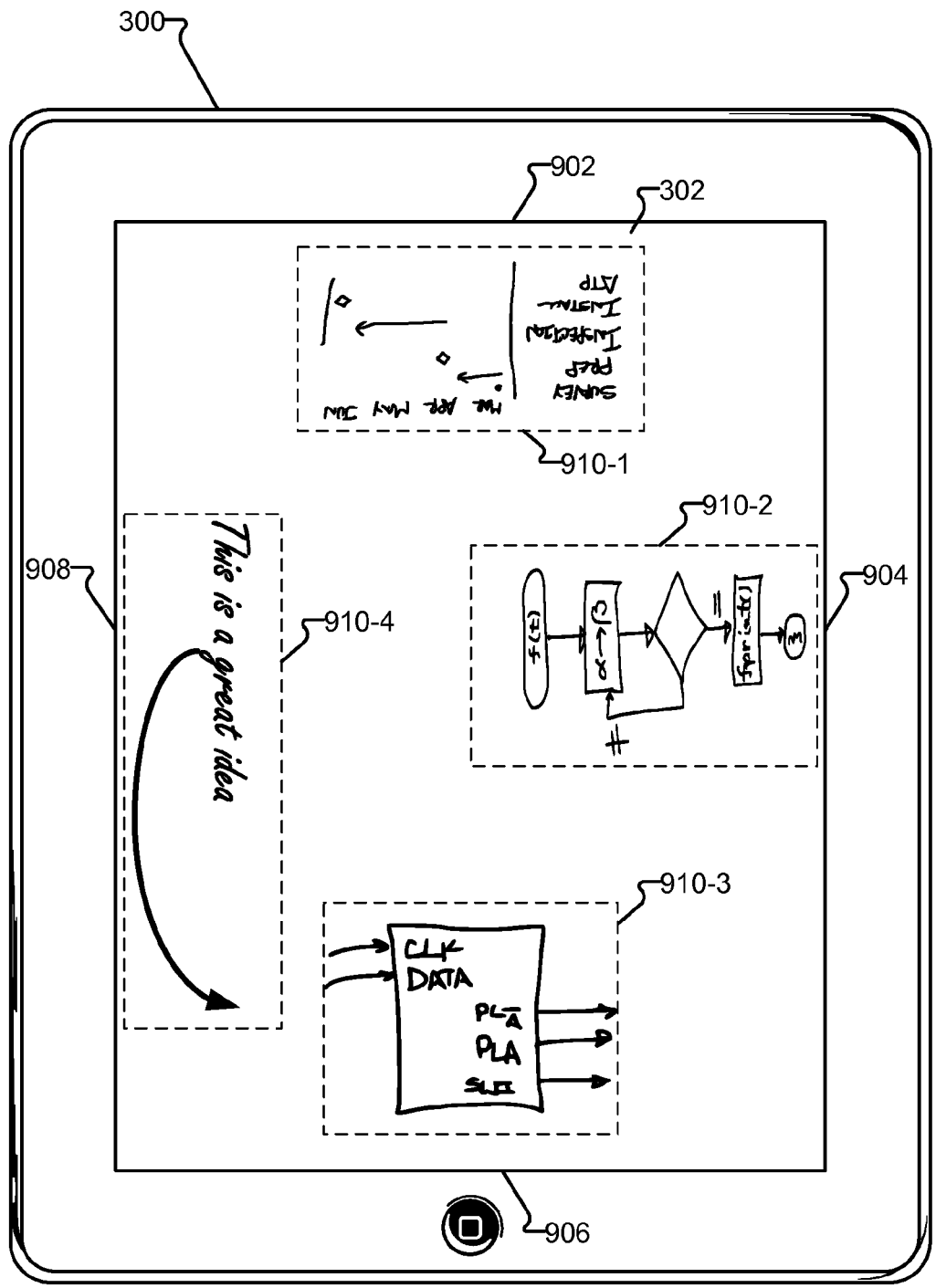

To illustrate, FIG. 9 shows the same mobile device 300 described in connection with FIG. 3. In the example of FIG. 9, four users are interacting with display screen 302 of mobile device 300—a first user located next to a top edge 902 of display screen 302, a second user located next to a right edge 904 of display screen 302, a third user located next to a bottom edge 906 of display screen 302, and a fourth user located next to a left edge 908 of display screen 302. As such, interaction events performed by the users may be oriented differently with respect to the display screen 302. For example, as shown in FIG. 9, graphical objects (e.g., graphical object 910-1) created by the first user may be oriented with respect to the top edge 902, graphical objects (e.g., graphical object 910-2) created by the second user may be oriented with respect to the right edge 904, graphical objects (e.g., graphical object 910-3) created by the third user may be oriented with respect to the bottom edge 906, and graphical objects (e.g., graphical object 910-4) created by the fourth user may be oriented with respect to the left edge 908. Touch gestures (e.g., multi-touch gestures such as rotate gestures, etc.) may also be oriented differently with respect to the display screen 302 depending on what side of the mobile device 300 the user is positioned.

In some examples, tracking facility 104 may detect the orientation of an interaction event (e.g., a graphical object or a touch gesture) with respect to display screen 302 and identify which user performed the interaction event accordingly. For example, tracking facility 104 may detect that graphical object 910-1 is oriented with respect to the top edge 902 of display screen 302 and accordingly identify the user located next to the top edge 902 as having created graphical object 910-1. In some examples, if this user has a user profile set up with tracking facility 104, tracking facility 104 may identify a name (or other user identifier) associated with the user. Alternatively, if the user does not have a user profile set up with tracking facility 104, tracking facility 104 may identify the user with a generic profile (e.g., a generic profile that simply identifies the likely position of the user at a time of creation of the graphical object).

In response to identifying a user as having performed an interaction event, tracking facility 104 may associate the interaction event with the user. For example, tracking facility 104 may associate the interaction event with the user by generating metadata associated with the interaction event that links the interaction event to the user. The metadata may include data descriptive of the identified user and/or any other suitable data as may serve a particular implementation. Tracking facility 104 may associate the interaction event with the user in any other manner (e.g., by tagging the interaction event with data representative of the identified user, etc.).

In some examples, it may be desirable for multiple users to be associated with a particular interaction event. For example, it may be desirable to associate multiple users with a particular interaction event to indicate that each of the users contributed to a particular idea represented by the interaction event. To this end, after tracking facility 104 has associated an interaction event with a particular user, tracking facility 104 may receive input representative of a request to further associate the interaction event with an additional user. The input may be provided in any suitable manner. For example, an additional tagging touch gesture associated with the additional user may be performed with respect to the whiteboard space displayed on the display. In response, tracking facility 104 may associate the interaction event with the additional user in any of the ways described herein.

In some examples, tracking facility 104 may record a timestamp and/or any other information associated with an interaction event that is associated with a particular user. A timestamp, for example, may allow tracking facility 104 to track when a particular interaction event is performed in addition to tracking who performs the interaction event.

In some examples, tracking facility 104 may include data representative of an interaction event performed during a collaboration session and a user associated with the interaction event in an interaction event log corresponding to the collaboration session. The data may link the interaction event to the user in a manner that allows tracking facility 104 to subsequently present data representative of the association between the interaction event and the user in any suitable manner.

For example, an interaction event log may include data representative of a plurality of interaction events performed during a collaboration session and a plurality of users associated with the interaction events in a manner that links each interaction event with a particular user. Tracking facility 104 may use the interaction event log to generate and present a summary of the collaboration session. This may be performed in any suitable manner. For example, tracking facility 104 may generate and/or present a summary interface (e.g., a digital document) that visually chronicles the collaboration session in accordance with the interaction event log.

Figure 10:
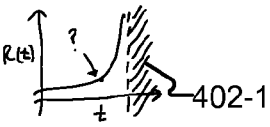
FIG. 10 shows an exemplary summary interface that visually chronicles interaction events performed during a collaboration session according to principles described herein.
Figure 10:
Figure 10:
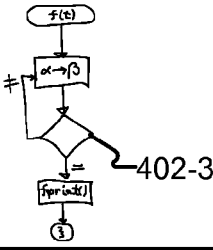
Figure 10:
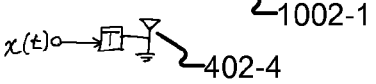
Figure 10:
Figure 10:
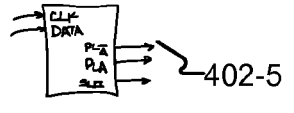

To illustrate, FIG. 10 shows an exemplary summary interface 1000 that visually chronicles interaction events performed during a collaboration session. Summary interface 1000 may be presented in any suitable manner. For example, summary interface 1000 may be displayed on the same display with which the users interact during the collaboration session, on a different display associated with a different computing device, and/or in any other manner as may serve a particular implementation.

As shown, summary interface 1000 visually chronicles interaction events performed during a collaboration session by displaying representations of the interaction events (e.g., graphical objects 402-1 through 402-6 and touch gestures 1002-1 and 1002-2) in an order that corresponds to an order in which the interaction events are performed during the collaboration session. Summary interface 1000 also identifies each user associated with each interaction event and lists a time at which each interaction event is performed. For example, summary interface 1000 indicates that a user named "User A" created graphical object 402-1 at 10:12 am and graphical object 402-2 at 10:14 am, a user named "User B" created graphical object 402-3 at 10:18 am, performed a "reverse pinch zoom" touch gesture at 10:21 am, and created graphical object 402-4 at 10:22 am, and a user named "User C" performed a "pinch zoom out" touch gesture at 10:25 am, created graphical object 402-5 at 10:29 am, and created graphical object 402-6 at 10:31 am. It will be recognized that summary interface 1000 may include additional or alternative content as may serve a particular implementation.

The interaction event log may be further used to provide real-time identification information associated with an interaction event during the collaboration session. For example, with respect to the example provided in connection with FIG. 4, a user may provide input representative of an inquiry regarding a particular user. The input may include any suitable input representative of a request to identify graphical objects associated with the particular user and may be received by tracking facility 104. In response and in accordance with the interaction event log, tracking facility 104 may visually highlight any graphical object associated with (i.e., created by) the particular user.

Figure 11:
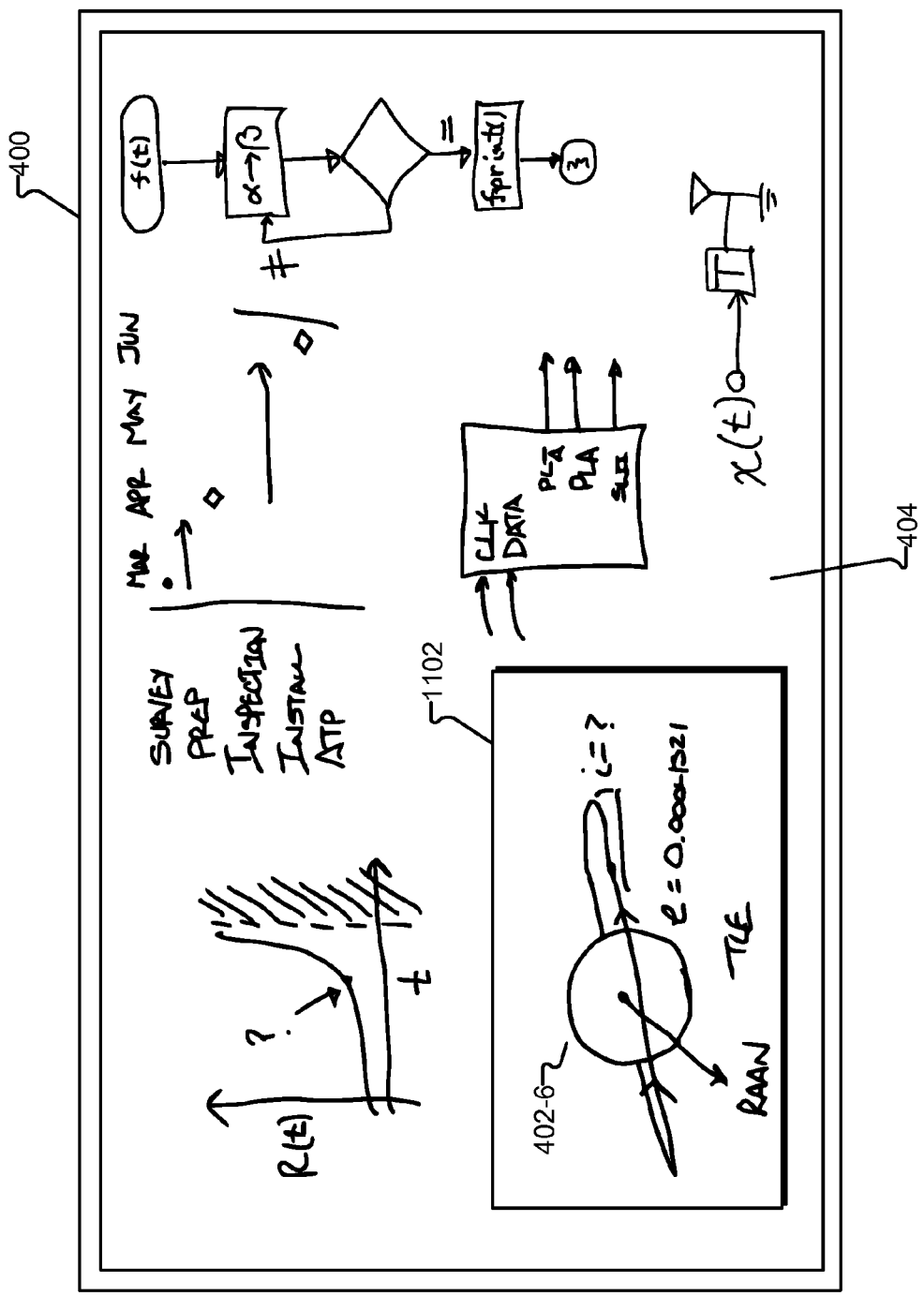
FIGS. 11-13 illustrate various actions that may be performed with respect to graphical objects displayed on a display according to principles described herein.

To illustrate, reference is made to FIG. 11, which shows the same display 400 described in connection with FIG. 4. In this example, tracking facility 104 has received input representative of an inquiry regarding the user associated with graphical object 402-6. In response, tracking facility 104 has visually highlighted graphical object 402-6 by surrounding graphical object 402-6 with a highlight box 1102. Tracking facility 104 may additionally or alternatively visually highlight a graphical object by adjusting one or more display properties (e.g., color) of the graphical object and/or in any other suitable manner.

Additionally or alternatively, a user may desire to know who created a particular graphical object displayed within a whiteboard space that is displayed on a display. To this end, the user may select the graphical object (e.g., by performing one or more touch gestures with respect to the graphical object). Tracking facility 104 may detect the selection of the graphical object, and, in response, present information identifying the user associated with the graphical object.

Figure 12:
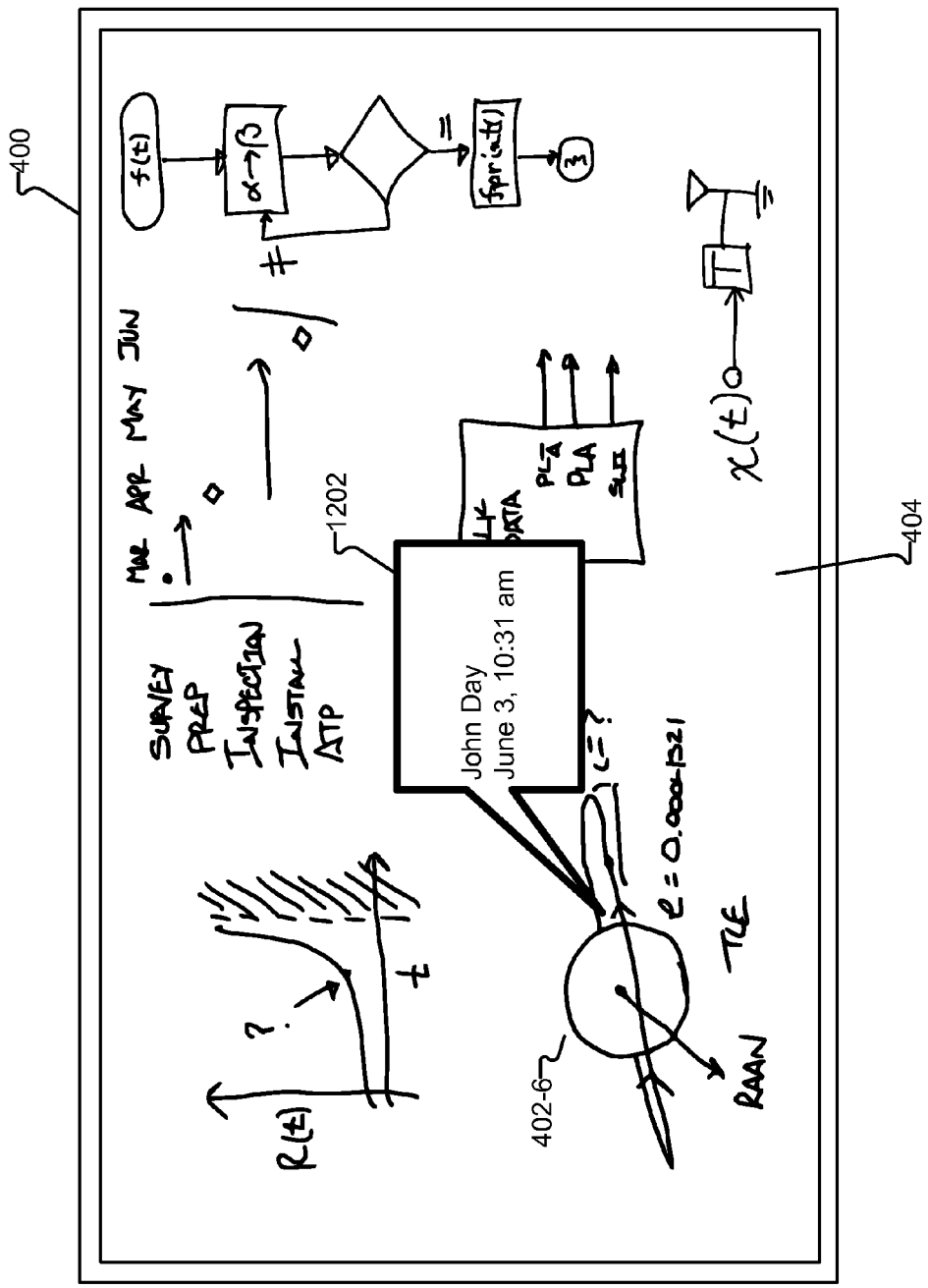

To illustrate, reference is made to FIG. 12, which shows the same display 400 described in connection with FIG. 4. In this example, a user has selected graphical object 402-6. In response, tracking facility 104 may present (e.g., direct the computing device associated with display 400 to display) information identifying the user who created graphical object 402-6. In the example of FIG. 12, this information is displayed within a call-out box 1202. The information may alternatively be presented in any other suitable manner.

In some examples, once a graphical object has been drawn or otherwise created within a whiteboard space that is displayed on a display, a user may perform one or more touch gestures with respect to the graphical object to direct tracking facility 104 to perform an action associated with the graphical object as specified by the touch gesture. For example, tracking facility 104 may email a representation (e.g., a copy) of the graphical object to one or more recipients, print a representation (e.g., a copy) of the graphical object, flag the graphical object for follow up, and/or otherwise take action with respect to the graphical object.

Figure 13:
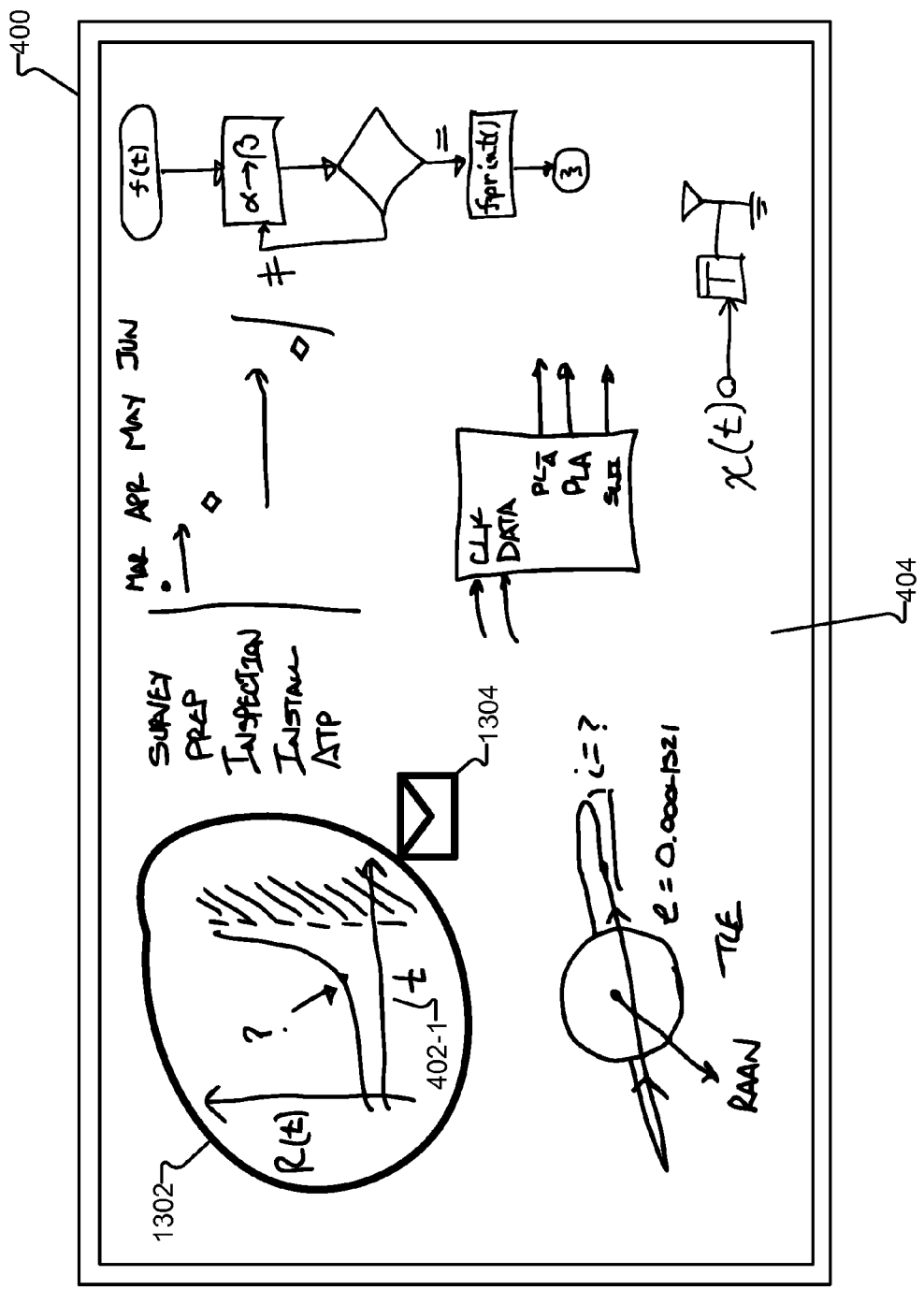

To illustrate, reference is made to FIG. 13, which shows the same display 400 described in connection with FIG. 4. As shown, a user has selected graphical object 402-1 by drawing a circle 1302 around graphical object 402-1. Graphical object 402-1 may alternatively be selected in any other suitable manner. After graphical object 402-1 has been selected, the user may perform a touch gesture associated with a particular action that is to be taken with respect to graphical object 402-1. For example, FIG. 13 shows that the user has drawn a representation of an envelope 1304 within whiteboard space 402 after selecting graphical object 402-1. In this example, the creation of envelope 1304 is configured to direct tracking facility 104 to email a representation of graphical object 402-1 to one or more recipients. Tracking facility 104 may detect the creation of envelope 1304 and accordingly present an email interface that the user may use to email a representation of graphical object 402-1 to one or more recipients.

Figure 14:
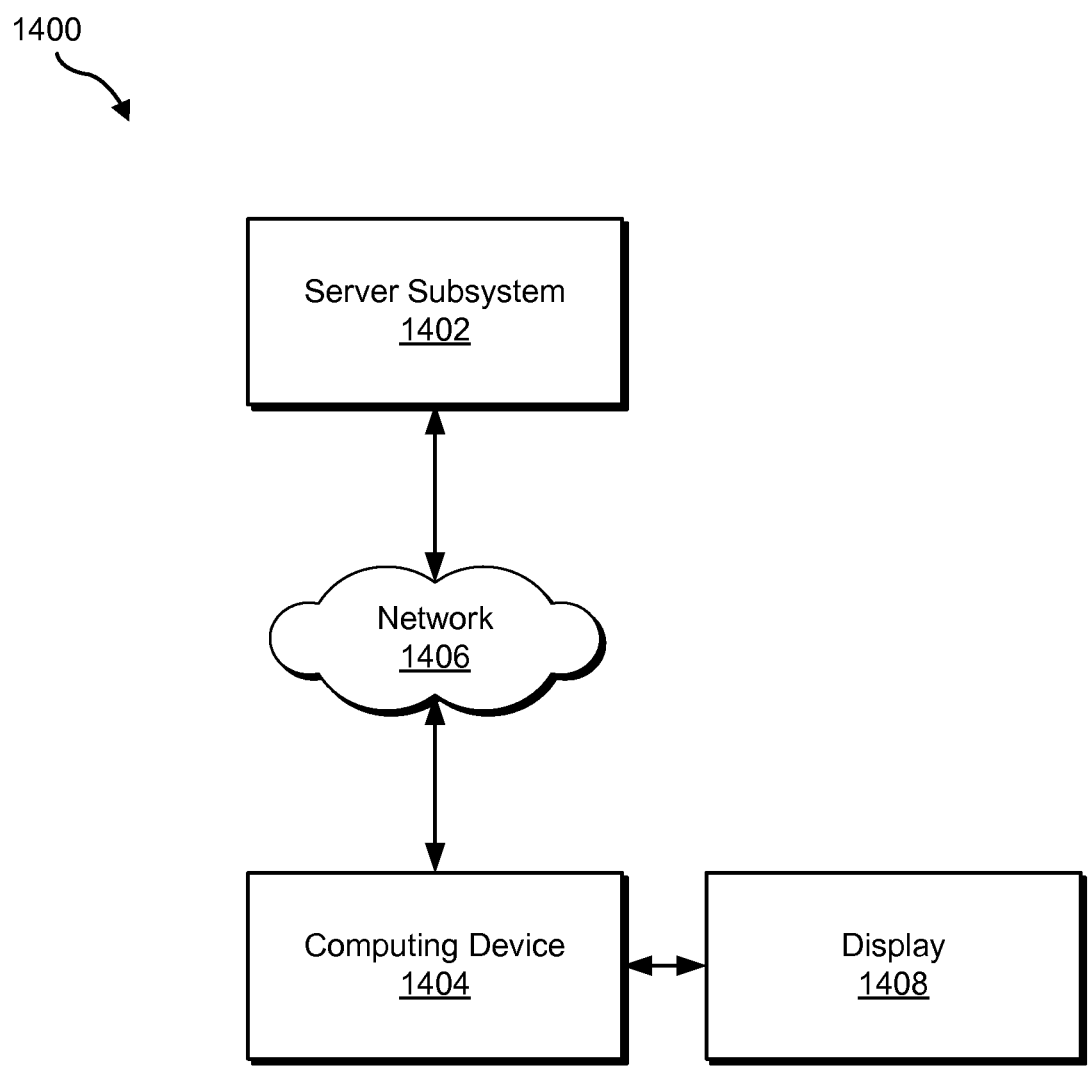
FIG. 14 illustrates an exemplary implementation of the system of FIG. 1 according to principles described herein.

FIG. 14 illustrates an exemplary implementation 1400 of system 100 wherein a server subsystem 1402 is communicatively coupled to a computing device 1404 by way of a network 1406. Computing device 1404 is associated with (e.g., connected to) a display 1408. As will be described in more detail below, detection facility 102, tracking facility 104, and storage facility 106 may each be implemented by server subsystem 1402, computing device 1404, and/or display 1408.

Server subsystem 1402 may be associated with a service provider (e.g., a collaboration service provider, an Internet service provider, etc.) and/or any other entity. Accordingly, server subsystem 1402 may be configured to provide one or more collaboration tracking services to users of computing device 1404. Server subsystem 1402 may be implemented by one or more computing devices as may serve a particular implementation.

Computing device 1404 may be implemented by any suitable combination of processing or computing devices. For example, computing device 1404 may be implemented by one or more personal computers, mobile devices (e.g., mobile phones and/or tablet computers), set-top box devices, digital video recording ("DVR") devices, personal-digital assistant devices, television devices, etc.

Display 1408 may be implemented by any of the displays described herein. For example, display 1408 may be implemented by an electronic whiteboard, a display screen integrated into or otherwise associated with a mobile device and/or any other computing device, etc.

Server subsystem 1402 and computing device 1404 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Representational State Transfer ("REST"), JavaScript Object Notation ("JSON"), Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., BLUETOOTH, Wi-Fi, etc.), in-band and out-of-band signaling technologies, and other suitable communications technologies.

Server subsystem 1402 and computing device 1404 may communicate using any suitable network. For example, as shown in FIG. 14, server subsystem 1402 and computing device 1404 may be configured to communicate with each other by way of network 1406. Network 1406 may include one or more networks or types of networks capable of carrying communications and/or data signals between server subsystem 1402 and computing device 1404. For example, network 1406 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by server subsystem 1402 or by computing device 1404 and display 1408. In other embodiments, components of system 100 may be distributed across server subsystem 1402, computing device 1404, and/or display 1408.

Figure 15:
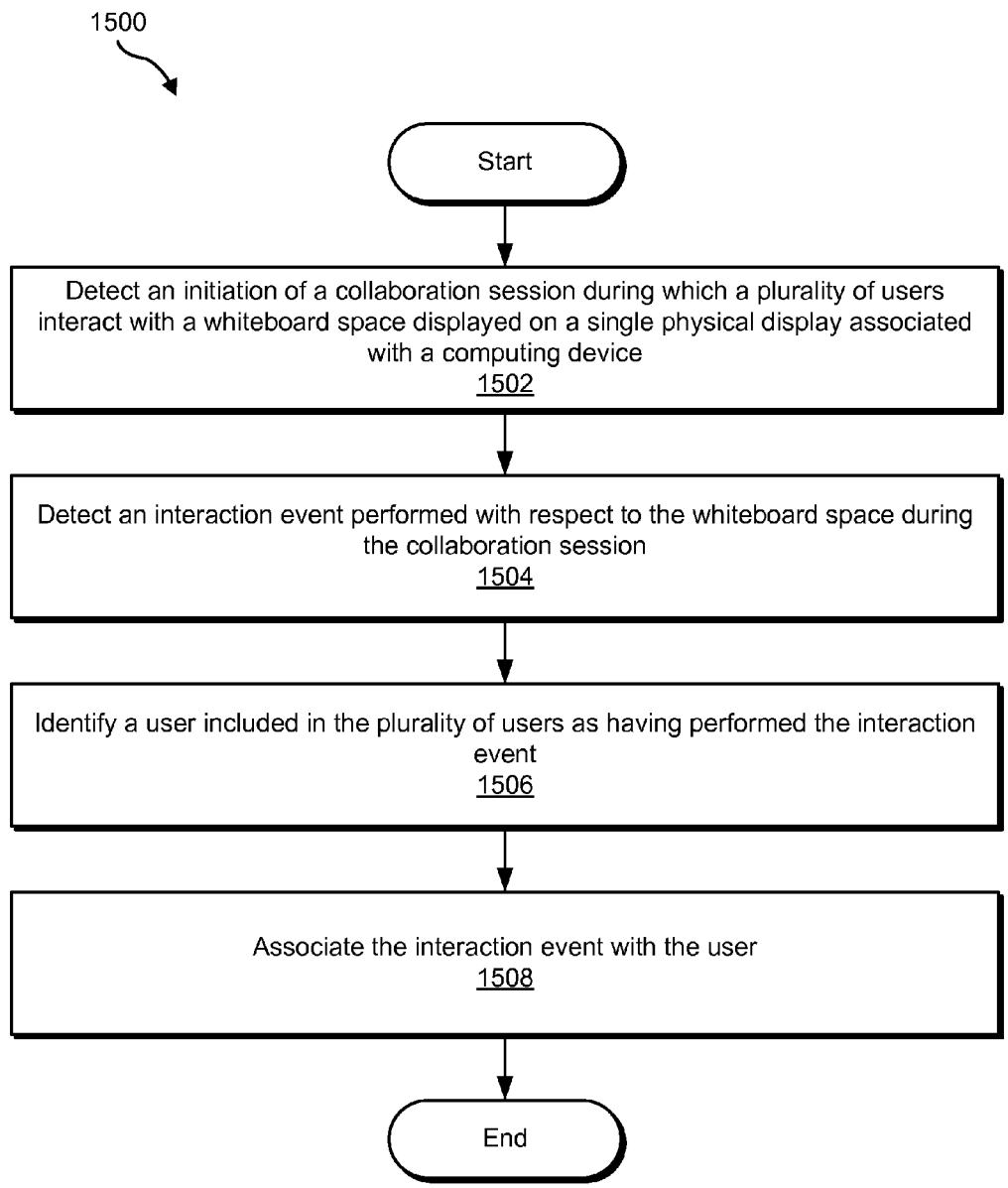
FIG. 15 illustrates an exemplary multi-user collaboration tracking method according to principles described herein.

FIG. 15 illustrates an exemplary multi-user collaboration tracking method 1500. While FIG. 15 illustrates exemplary steps according to one embodiment, other embodiments may omit, add to, reorder, and/or modify any of the steps shown in FIG. 15. One or more of the steps shown in FIG. 15 may be performed by system 100 and/or any implementation thereof.

In step 1502, a multi-user collaboration tracking system detects an initiation of a collaboration session during which a plurality of users interact with a whiteboard space displayed on a single physical display associated with a computing device. Step 1502 may be performed in any of the ways described herein.

In step 1504, the multi-user collaboration tracking system detects an interaction event performed with respect to the whiteboard space during the collaboration session. Step 1504 may be performed in any of the ways described herein.

In step 1506, the multi-user collaboration tracking system identifies a user included in the plurality of users as having performed the interaction event. Step 1506 may be performed in any of the ways described herein.

In step 1508, the multi-user collaboration tracking system associates the interaction event with the user. Step 1508 may be performed in any of the ways described herein.

Figure 16:
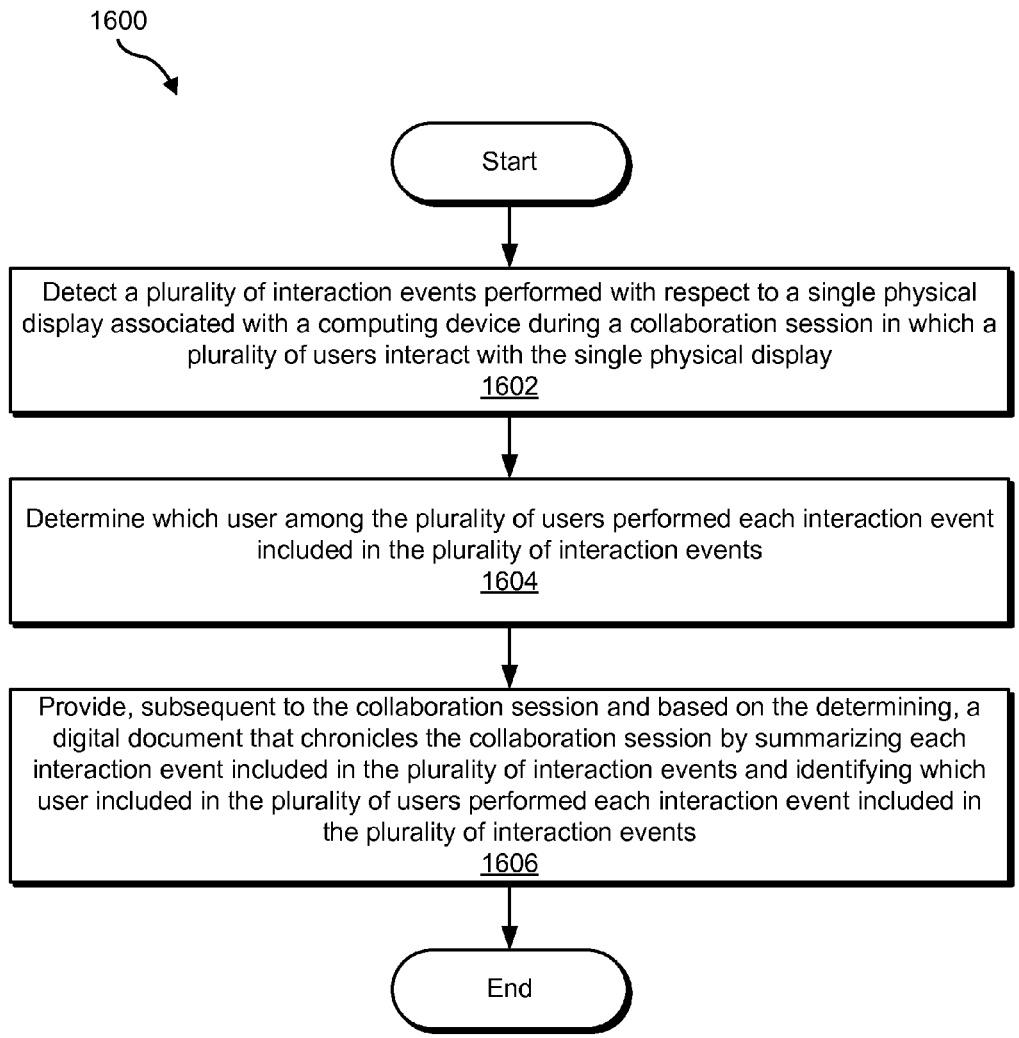
FIG. 16 illustrates another exemplary multi-user collaboration tracking method according to principles described herein.

FIG. 16 illustrates another exemplary multi-user collaboration tracking method 1600. While FIG. 16 illustrates exemplary steps according to one embodiment, other embodiments may omit, add to, reorder, and/or modify any of the steps shown in FIG. 16. One or more of the steps shown in FIG. 16 may be performed by system 100 and/or any implementation thereof.

In step 1602, a multi-user collaboration tracking system detects a plurality of interaction events performed with respect to a single physical display associated with a computing device during a collaboration session in which a plurality of users interact with the single physical display. Step 1602 may be performed in any of the ways described herein. For example, the multi-user collaboration tracking system may detect the plurality of interaction events performed with respect to a whiteboard space displayed on the single physical display.

In step 1604, the multi-user collaboration tracking system determines which user among the plurality of users performed each interaction event included in the plurality of interaction events. Step 1604 may be performed in any of the ways described herein.

In step 1606, the multi-user collaboration tracking system provides, subsequent to the collaboration session and based on the determination made in step 1604, a digital document that chronicles the collaboration session by summarizing each interaction event included in the plurality of interaction events and identifying which user included in the plurality of users performed each interaction event included in the plurality of interaction events. Step 1606 may be performed in any of the ways described herein.

In certain embodiments, one or more of the processes described herein may be implemented at least in part as instructions embodied in a non-transitory computer-readable medium and executable by one or more computing devices.

In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
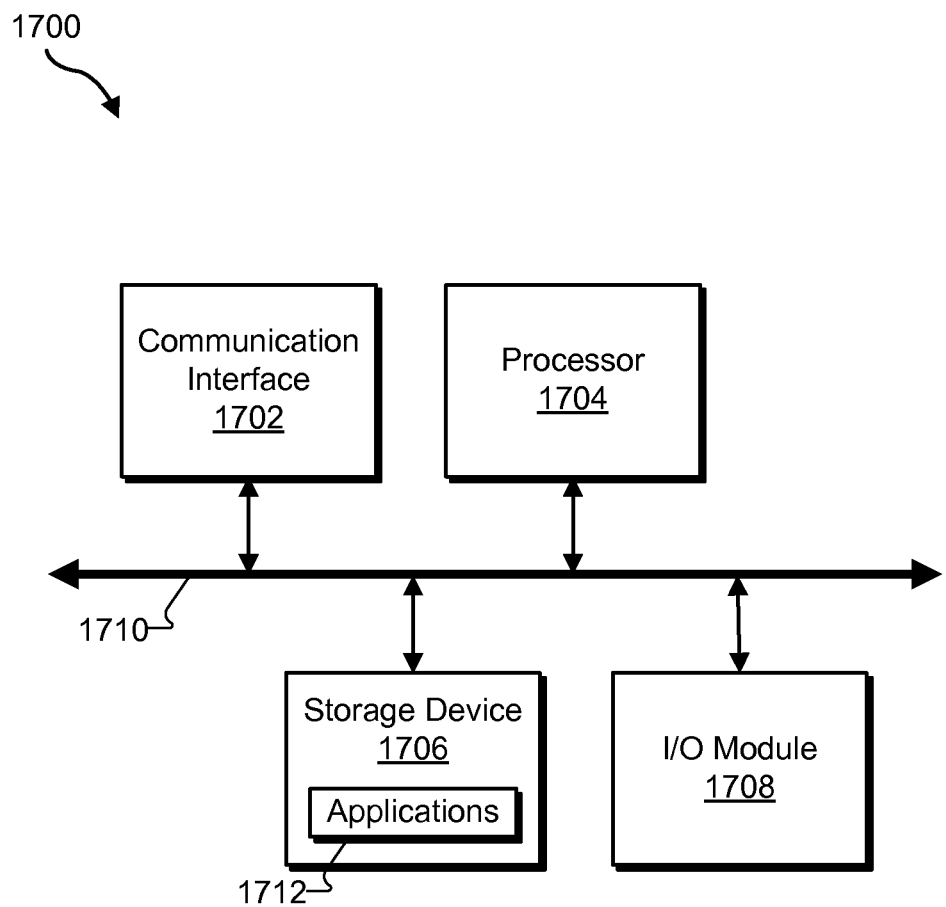
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with detection facility 102 and/or tracking facility 104. Likewise, storage facility 106 may be implemented by or within storage device 1706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a multi-user collaboration tracking system, an initiation of a collaboration session during which a plurality of users interact with a whiteboard space displayed on a single physical display associated with a computing device, wherein the plurality of users interact with the whiteboard space during the collaboration session by touching the single physical display, the whiteboard space resembling one of a blank whiteboard, a blank paper, and a blank chalkboard before the collaboration session commences;
    detecting, by the multi-user collaboration tracking system, an interaction event performed with respect to the whiteboard space during the collaboration session;
    identifying, by the multi-user collaboration tracking system, a user included in the plurality of users interacting with the whiteboard space displayed on the single physical display as having performed the interaction event, the identifying including:
        detecting a tagging touch gesture in which the user draws a shape of the tagging touch gesture in a designated area within the whiteboard space during the collaboration session, the shape of the tagging touch gesture predefined by the user based on an input provided by the user that defines a particular shape of tagging touch gesture as being unique to the user;
        determining an orientation of the interaction event with respect to a side included in a plurality of sides of the single physical display; and
        identifying the user based on the tagging touch gesture and the determined orientation of the interaction event with respect to the side included in the plurality of sides of the single physical display;
    associating, by the multi-user collaboration tracking system, the interaction event and each additional interaction event, which is performed within the whiteboard space after the detecting of the tagging touch gesture and before detecting an additional tagging touch gesture, with the user;
    including, by the multi-user collaboration tracking system, data representative of the interaction event and the user associated with the interaction event in an interaction event log corresponding to the collaboration session, the interaction event log comprising data that is representative of a plurality of other interaction events and a plurality of other users associated with the plurality of other interaction events and that includes one or more graphical objects that depict display elements that are drawn by one or more of the plurality of users and that are representative of one or more of the plurality of other interaction events; and
    presenting, by the multi-user collaboration tracking system, a summary of the collaboration session for display to a user, the summary including data representative of each interaction event performed during the collaboration session, information indicating which user included in the plurality of users performed each interaction event performed during the collaboration session, and the one or more graphical objects in accordance with the interaction event log.

2. The method of claim 1, further comprising:
    detecting, by the multi-user collaboration tracking system, an additional interaction event performed with respect to the whiteboard space during the collaboration session;
    identifying, by the multi-user collaboration tracking system, an additional user included in the plurality of users as having performed the additional interaction event; and
    associating, by the multi-user collaboration tracking system, the additional interaction event with the additional user.

3. The method of claim 1, wherein the interaction event comprises a creation by the user of a graphical object that is displayed within the whiteboard space, and wherein the method further comprises:

detecting, by the multi-user collaboration tracking system, a selection of the graphical object; and presenting, by the multi-user collaboration tracking system in response to the selection of the graphical object, information identifying the user associated with the interaction event.

4. The method of claim 3, wherein the presenting comprises directing the computing device to display the information on the single physical display.

5. The method of claim 1, wherein the interaction event comprises a creation by the user of a graphical object that is displayed within the whiteboard space, and wherein the method further comprises:

receiving, by the multi-user collaboration tracking system, an additional input representative of an inquiry regarding the user; and visually highlighting, by the multi-user collaboration tracking system in response to the additional input representative of an inquiry regarding the user, the graphical object.

6. The method of claim 1, wherein:

the tagging touch gesture is drawn by the user prior to the interaction event being performed; and the identifying of the user as having performed the interaction event further comprises:

determining that no other intervening tagging touch gesture has been performed with respect to the whiteboard space in between the tagging touch gesture being performed and the interaction event being performed.

7. The method of claim 1, wherein the identifying of the user as having performed the interaction event further comprises:

detecting handwriting used to perform the interaction event; and identifying the user based on the handwriting.

8. The method of claim 1, wherein the associating of the interaction event with the user comprises generating metadata associated with the interaction event that links the interaction event to the user.

9. The method of claim 1, wherein the interaction event comprises a creation by the user of a graphical object that is displayed within the whiteboard space or a touch gesture performed by the user with respect to the whiteboard space.

10. The method of claim 1, further comprising recording, by the multi-user collaboration tracking system, a timestamp associated with the interaction event.

11. The method of claim 1, further comprising:

receiving, by the multi-user collaboration tracking system, an additional input representative of a request to further associate the interaction event with an additional user included in the plurality of users; and associating, by the multi-user collaboration tracking system in response to the request, the interaction event with the additional user.

12. The method of claim 1, wherein the interaction event comprises a creation by the user of a graphical object that is displayed within the whiteboard space, and wherein the method further comprises:

detecting, by the multi-user collaboration tracking system, a touch gesture performed with respect to the graphical object displayed within the whiteboard space; and performing, by the multi-user collaboration tracking system, an action with respect to the graphical object as specified by the touch gesture.

13. The method of claim 1, embodied as computer-executable instructions on at least one non-transitory computer-readable medium.

14. The method of claim 1, wherein the-identifying of the user as having performed the interaction event further comprises:

determining an orientation of the user with respect to the side included in the plurality of sides when the interaction event was performed; and automatically identifying the user based on the determining of the orientation of the interaction event and the determining of the orientation of the user when the interaction event was performed.

15. A method comprising:

detecting, by a multi-user collaboration tracking system, an initiation of a collaboration session during which a plurality of users interact with a whiteboard space displayed on a single physical display associated with a computing device;

detecting, by the multi-user collaboration tracking system, an interaction event performed with respect to the whiteboard space during the collaboration session, the interaction event comprising a creation, by a user included in the plurality of users interacting with the whiteboard space displayed on the single physical display, of a graphical object that is displayed within the whiteboard space;

identifying, by the multi-user collaboration tracking system, the user as having performed the interaction event, the identifying including:

detecting a tagging touch gesture in which the user draws a shape of the tagging touch gesture in a designated area in the whiteboard space after the graphical object is created, the shape of the tagging touch gesture predefined by the user based on an input provided by the user that defines a particular shape of tagging touch gesture as being unique to the user;

determining an orientation of the interaction event with respect to a side included in a plurality of sides of the single physical display; and identifying the user based on the tagging touch gesture and the determined orientation of the interaction event with respect to the side included in the plurality of sides of the single physical display; and associating, by the multi-user collaboration tracking system, the interaction event and each additional interaction event, which is performed within the whiteboard space after the detecting of the tagging touch gesture and before detecting an additional tagging touch gesture, with the user.

16. A method comprising:

detecting, by a multi-user collaboration tracking system, an initiation of a collaboration session during which a plurality of users interact with a whiteboard space displayed on a single physical display associated with a computing device;

detecting, by the multi-user collaboration tracking system, an interaction event performed with respect to the whiteboard space during the collaboration session, the interaction event comprising a creation, by a user included in the plurality of users interacting with the whiteboard space displayed on the single physical display, of a graphical object that is displayed within the whiteboard space;

identifying, by the multi-user collaboration tracking system, the user as having performed the interaction event, the identifying including:
  detecting a selection of the graphical object;
  detecting a tagging touch gesture in which the user draws a shape of the tagging touch gesture in a designated area in the whiteboard space, the shape of the tagging touch gesture predefined by the user based on an input provided by the user that defines a particular shape of tagging touch gesture as being unique to the user;
  determining an orientation of the interaction event with respect to a side included in a plurality of sides of the single physical display; and
  identifying the user based on the tagging touch gesture and the determined orientation of the interaction event with respect to the side included in the plurality of sides of the single physical display; and
associating, by the multi-user collaboration tracking system, the interaction event and each additional interaction event, which is performed within the whiteboard space after the detecting of the tagging touch gesture and before detecting an additional tagging touch gesture, with the user.

17. A method comprising:
detecting, by a multi-user collaboration tracking system, a plurality of interaction events performed with respect to a single physical display associated with a computing device during a collaboration session in which a plurality of users interact with the single physical display by touching the single physical display, the single physical display resembling one of a blank whiteboard, a blank paper, and a blank chalkboard before the collaboration session commences;
determining, by the multi-user collaboration tracking system, which user among the plurality of users performed each interaction event included in the plurality of interaction events by touching the single physical display, the determining including
  detecting a tagging touch gesture in which one of the plurality of users draws a shape of the tagging touch gesture in a designated area within the single physical display during the collaboration session, the shape of the tagging touch gesture predefined by the one of the plurality of users based on an input provided by the one of the plurality of users that defines a particular shape of tagging touch gesture as being unique to the one of the plurality of users,
  determining an orientation of each interaction event with respect to a side included in a plurality of sides of the single physical display, and
  identifying the one of the plurality of users based on the tagging touch gesture and the determined orientation of each interaction event with respect to the side included in the plurality of sides of the single physical display;
associating, by the multi-user collaboration tracking system, each interaction event included in the plurality of interaction events, which is performed after the detecting of the tagging touch gesture and before detecting an additional tagging touch gesture, with the one of the plurality of users; and
providing, by the multi-user collaboration tracking system subsequent to the collaboration session and based on the determining, a digital document for display to a user, the digital document chronicling the collaboration session by summarizing each interaction event included in the plurality of interaction events;
wherein the digital document includes data representative of each interaction event performed during the collaboration session, information indicating which user included in the plurality of users performed each interaction event performed during the collaboration session, and one or more graphical objects that depict display elements that are drawn by one or more of the plurality of users and that are representative of one or more of the plurality of other interaction events.

18. The method of claim 17, embodied as computer-executable instructions on at least one non-transitory computer-readable medium.

19. A system comprising
at least one physical computing device that
  detects an initiation of a collaboration session during which a plurality of users interact with a whiteboard space displayed on a single physical display associated with the at least one physical computing device, wherein the plurality of users interact with the whiteboard space during the collaboration session by touching the single physical display, the whiteboard space resembling one of a blank whiteboard, a blank paper, and a blank chalkboard before the collaboration session commences,
  detects an interaction event performed with respect to the whiteboard space during the collaboration session,
  identifies a user included in the plurality of users interacting with the whiteboard space displayed on the single physical display as having performed the interaction event by
    detecting a tagging touch gesture in which the user draws a shape of the tagging touch gesture in a designated area within the whiteboard space during the collaboration session, the shape of the tagging touch gesture predefined by the user based on an input provided by the user that defines a particular shape of tagging touch gesture as being unique to the user;
    determining an orientation of the interaction event with respect to a side included in a plurality of sides of the single physical display; and
    identifying the user based on the tagging touch gesture and the determined orientation of the interaction event with respect to the side included in the plurality of sides of the single physical display;
  associates the interaction event and each additional interaction event, which is performed within the whiteboard space after the detecting of the tagging touch gesture and before detecting an additional tagging touch gesture, with the user,
  includes data representative of the interaction event and the user associated with the interaction event in an interaction event log corresponding to the collaboration session, the interaction event log comprising data that is representative of a plurality of other interaction events and a plurality of other users associated with the plurality of other interaction events and that includes one or more graphical objects that depict display elements that are drawn by one or more of the plurality of users and that are representative of one or more of the plurality of other interaction events, and presents a summary of the collaboration session for display to a user, the summary including data representative of each interaction event performed during the collaboration session, information indicating which user included in the plurality of users performed each interaction event performed during the collaboration session, and the one or more graphical objects in accordance with the interaction event log.

* * * * *